United States Patent [19]

Dammann

[11] 4,451,628

[45] May 29, 1984

[54] PROCESS FOR PREPARING LOW MOLECULAR WEIGHT WATER-SOLUBLE POLYMERS BY COPOLYMERIZING WITH WATER-SOLUBLE MONOMERS A CALCULATED QUANTITY OF METHALLYLSULFONATE MONOMER

[75] Inventor: Laurence G. Dammann, Crestwood, Ky.

[73] Assignee: Celanese Corporation, New York, N.Y.

[21] Appl. No.: 417,249

[22] Filed: Sep. 13, 1982

[51] Int. Cl.³ .............................. C08F 2/16; C08F 2/38
[52] U.S. Cl. .................................... 526/225; 526/287; 526/303.1; 526/317; 526/292.2; 526/307.6
[58] Field of Search ........................ 526/240, 225, 287

[56] References Cited

U.S. PATENT DOCUMENTS

| | | | |
|---|---|---|---|
| 3,202,641 | 8/1965 | Nakajima et al. | 526/287 |
| 3,203,938 | 8/1965 | Baechtold | 526/287 |
| 3,779,917 | 12/1973 | Norton et al. | 252/8.55 D |
| 4,024,040 | 5/1977 | Phalangas et al. | 204/159.22 |
| 4,037,040 | 7/1977 | Trapasso et al. | 526/88 |
| 4,058,509 | 11/1977 | Menand et al. | 526/287 |
| 4,126,603 | 11/1978 | Lorenz et al. | 526/240 |

FOREIGN PATENT DOCUMENTS 2077278 12/1981 United Kingdom ............... 526/287

Primary Examiner—C. A. Henderson
Attorney, Agent, or Firm—Herbert P. Price

[57] ABSTRACT

This invention provides a process for preparing water-soluble polymers with a controlled low molecular weight, the molecular weight of the polymer being controlled by the presence of a calculated quantity of methallylsulfonate monomer during the polymerization reaction. The molecular weight of the polymer varies inversely with the quantity of methallylsulfonate monomer that is present. Low molecular weight water-soluble polymers are useful as oil well drilling additives, dispersants and the like.

11 Claims, No Drawings

PROCESS FOR PREPARING LOW MOLECULAR WEIGHT WATER-SOLUBLE POLYMERS BY COPOLYMERIZING WITH WATER-SOLUBLE MONOMERS A CALCULATED QUANTITY OF METHALLYLSULFONATE MONOMER

BACKGROUND OF THE INVENTION

The field to which this invention pertains is water-soluble polymers of controlled low molecular weights made by copolymerizing methallylsulfonic acid or its alkali metal salts with water-soluble monomers.

Synthetic water-soluble polymers find a variety of important applications, such as high performance flocculants which settle industrial slurries and remove suspended matter from municipal or process water. It is desirable that such water-soluble polymeric flocculants have as high a molecular weight as possible, e.g., polyacrylamide with a molecular weight of 8–20 million as described in U.S. Pat. No. 3,929,951.

In various other applications, however, it has been found that low molecular weight water-soluble polymers perform better than do their high molecular weight counterparts. Such applications include use as oil well drilling additives, strength/retention aids in paper manufacture, dispersants, scale inhibitors, and the like.

Synthetic water-soluble polymers generally are produced in either aqueous solution or inverse emulsion polymerization systems. The control of polymer molecular weight in such polymerization systems is not readily accomplished in a predictable manner. It is particularly difficult to achieve the production of a synthetic water-soluble polymer which has a low molecular weight within a narrow range of molecular weight distribution.

The use of sulfonate type monomers as comonomers in water-soluble polymers is described in the prior art. However, control-of-molecular weight using these monomers is not taught.

U.S. Pat. No. 3,202,641 describes the production of water-insoluble acrylonitrile copolymers by polymerization of monomers in the presence of an unsaturated sulfonic acid compound and a chlorate sulfite catalyst.

U.S. Pat. No. 3,203,938 describes a process for preparing low molecular weight water-soluble polymers of alkali metal ethylene sulfonate and acrylamide or acrylic acid in an alcohol solvent medium.

U.S. Pat. No. 3,779,917 describes the production of high molecular weight copolymers of vinyl sulfonate and acrylamide for use as mobility control agents in the secondary recovery of petroleum.

U.S. Pat. No. 4,024,040 describes a process for preparing a water-soluble, substantially linear, high molecular weight polymer by irradiation of an aqueous solution of selected monomers. The polymers disclosed include those containing a vinyl sulfonic acid monomer.

U.S. Pat. Nos. 4,037,040; 4,058,509; and 4,126,603 also describe various types of high molecular weight polymers which contain a polymerized ethylenically unsaturated sulfonate monomer such as sodium styrene sulfonate, sodium methallylsulfonate, vinylsulfonic acid, allylsulfonic acid, and the like.

It is an object of this invention to provide an improved process for synthesizing low molecular weight water-soluble polymers.

It is another object of this invention to provide a process for preparing synthetic water-soluble polymers, and concomitantly for controlling the molecular weight of the product in a low range with a narrow molecular weight distribution in a predictable manner.

Other objects and advantages of the present invention shall become apparent from the accompanying description and examples.

DESCRIPTION OF THE INVENTION

One or more objects of the present invention are accomplished by the provision of a process for preparing a water-soluble polymer of controlled low molecular weight which comprises copolymerizing a mixture comprising water-soluble monomers, which includes between about 0.01–5 weight percent methallylsulfonic acid or its alkali metal salts based on the weight of monomers, in an aqueous environment under free radical polymerization conditions.

The term "water-soluble" polymer as employed herein refers to a polymer which dissolves in a quantity of at least 90 weight percent in water, in accordance with the test conditions described in U.S. Pat. No. 4,024,040.

The term "polymer" as employed herein refers to water-soluble anionic and ampholytic copolymers which contain recurring polymerized alkali metal methallylsulfonate monomeric units.

The term "ampholytic" copolymers as employed herein refers to polymers which contain recurring polymerized anionic and cationic units.

The term "controlled low molecular weight" as employed herein refers to the molecular weight of a water-soluble polymer which is narrowly uniform in molecular weight distribution within the range between about 10,000 to 2,000,000.

The presence of an alkali metal methallylsulfonate or methallylsulfonic acid component in the monomer mixture is an essential aspect of the invention process. The alkali metal group can be sodium, potassium or lithium. The preferred monomeric sulfonate salt is sodium methallylsulfonate.

In addition to the methallylsulfonate monomer, the monomer mixture contains one or more other free radical polymerizable monomers. Such monomers are described as water-soluble monomers, i.e., those monomers which, when polymerized, form water-soluble polymers. Illustrative of suitable monomers are acrylamide, methacrylamide, acrylic acid, methacrylic acid, fumaric acid, maleic acid, itaconic acid, the alkali metal and ammonium salts of these acids, dimethylaminoethyl acrylate, dimethylaminoethyl methacrylate, their corresponding acid and quaternary salts, and the like.

The monomer mixture can contain water-insoluble monomers, i.e., monomers which, when polymerized, form water-insoluble polymers. However, only a minor amount of such monomers should be used, i.e., not enough to render the resulting polymer water-insoluble. Generally, no more than about 20 weight percent of such monomers should be present in the monomer mixture. Illustrative of such monomers are methyl acrylate, ethyl acrylate, butyl acrylate, methyl methacrylate, acrylonitrile, styrene, vinyl toluene, vinyl chloride, vinylidene chloride, and the like.

The invention process can be conducted under free radical polymerization conditions, at a temperature between about 0°–100° C., preferably 20°–80° C., either as an aqueous solution system or as a water-in-oil emulsion system (i.e., inverse emulsion). Typical free radical polymerization systems are described in U.S. patents such as U.S. Pat. Nos. 3,284,393; 3,509,114; 3,624,019; 4,022,731; 4,024,040; 4,037,040; 4,242,247 and the like.

In the case of an aqueous solution system, the aqueous medium can include up to about 50 weight percent of a water-soluble alkanol, such as methanol, ethanol or isopropanol. It is disclosed in the prior art (e.g., U.S. Pat. No. 3,203,938) that the presence of alkanol in a free radical polymerization medium favors the production of lower molecular weight forms of polymers such as polyacrylamide.

The polymerization is preferably conducted with the aid of a polymerization catalyst to shorten the period of time required for polymerization, e.g., 0.5–12 hours.

The catalysts may be employed alone or as a redox system with a water-soluble activator. Among the suitable catalysts are the inorganic peroxides, e.g., hydrogen peroxide, barium peroxide and magnesium peroxide; the dialkyl peroxides, e.g., diethyl peroxide and dipropyl peroxide; the alkyl hydrogen peroxides, e.g., tertiary-butyl hydrogen peroxide and tertiary-amyl hydrogen peroxide; symmetrical diacyl peroxides, e.g., acetyl peroxide, propionyl peroxide, malonyl peroxide, succinyl peroxide and benzoyl peroxide; and salts of inorganic peracids, e.g., ammonium persulfate, sodium persulfate, potassium persulfate, sodium perborate and potassium perborate. Other types of catalysts, e.g., a,a'-azodiisobutyronitrile, also can be used to initiate polymerization.

Illustrative examples of water-soluble activators of the redox catalyst systems which may be employed with the catalysts are oxygen-containing sulfur compounds which are capable of undergoing oxidation, such as sulfur dioxide, the alkali metal bisulfites, hydrosulfites, thiosulfates, sulfurous acid (or compounds which engender sulfurous acid), e.g., alkali metal sulfites, ethyl and other alkyl sulfites, and various organic sulfinic acids, e.g., p-toluene sulfinic acid and formamidine sulfinic acid.

The quantity of polymerization catalyst employed will vary over a wide range, depending on the concentrations and types of monomers, the temperature, the type of polymerization system, e.g., solution or inverse emulsion, the type of catalyst, and the like. Typically the quantity of polymerization catalyst employed will vary in the range between about 0.001–1.0 weight percent, based on the weight of monomers being polymerized.

Optionally, other means of initiating polymerization may be employed, such as heat, light, irradiation (e.g., cobalt 60) and the like, or combinations of the various methods.

A unique aspect of the present invention process is the ability to control the molecular weight of the water-soluble polymer, so that a low molecular weight product is obtained which has a narrow molecular weight distribution range. The control of the molecular weight of the water-soluble polymer is effected by the quantity of alkali metal methallylsulfonate or methallylsulfonic acid monomer employed.

The direct interrelationship between the quantity of methallylsulfonate monomer and the ultimate polymer product molecular weight range is demonstrated by Example 1. As listed in Table I of the example, the molecular weight of an acrylic acid copolymer which contains 2 weight percent sodium methallylsulfonate is 415,000. When the amount of copolymerized sodium methallylsulfonate is doubled (4%), the molecular weight is cut approximately in half—225,000. When the monomer is increased by 2.5 to 5%, the molecular weight is decreased by about the same factor, i.e., to 160,000. Thus it can be seen that within these measurable ranges, the molecular weight of the copolymers was inversely proportional to the weight percent sodium metallylsulfonate used and that the relationship was linear.

The advantages of the present invention process are predicated on the discovery that alkali metal metallylsulfonate or methallylsulfonic acid has a unique combination of properties under free radical polymerization conditions when copolymerized with one or more other water-soluble monomers. The invention process is particularly adapted for copolymerization of alkali metal methallylsulfonate with acrylamide or acrylic acid, or a combination of these monomers (e.g., an acrylamide/acrylic acid ratio of 98:2 to 60:40).

The said alkali metal methallylsulfonate monomer exhibits highly selective polymerization reactivity, such that the molecular weight of the resultant water-soluble polymer is directly dependent on and controlled by the concentration of the said monomer that is present. This gives to the art a highly predictable method of molecular weight control.

Unexpectedly, other closely related monomers such as sodium allylsulfonate and sodium vinylsulfonate are not effective for controlling and reducing the molecular weight of a water-soluble polymer such as polyacrylamide. Alkali metal methallylsulfonate is exceptional for this purpose. In addition, unlike other monomers of similar structure, it is not inhibitory towards the vinyl polymerization mechanism. The copolymerization of various polymerizable vinylsulfonate monomers has been disclosed in the prior art as described hereinbefore, but without any contemplation or suggestion of molecular weight control in the resultant copolymer products.

The following Examples are further illustrative of the present invention. The reactants and other specific ingredients and conditions are presented as being typical, and various modifications can be devised in view of the foregoing disclosure within the scope of the invention. Parts and percentages where used are parts and percentages by weight.

EXAMPLE 1

A series (Table I) of polyacrylic acid solution polymers containing 0 to 5 weight percent sodium methallylsulfonate were prepared as follows:

In a suitable reaction flask 200 parts of deionized water were heated to 80° C. under a nitrogen sparge over a 20 minute period. Potassium persulfate, 0.2 part, was then added. One hundred parts of monomer solution, acrylic acid or acrylic acid and sodium methallylsulfonate, were added dropwise over one hour while maintaining the temperature at 80° C. After the addition was completed, 5 parts of a 2% aqueous solution of potassium persulfate were added. Heating at 80° C. was then continued for 2 hours. All the polymers were made at 35% solids except the homopolymer of acrylic acid. The homopolymer had to be diluted with water during the polymerization in order to maintain a stirrable viscosity.

TABLE I

| Weight % Sodium Methallylsulfonate In Polymer With Acrylic Acid | % N.V. | Brookfield Viscosity CPS, RVT, 20 RPM | Average Molecular Weight |
|---|---|---|---|
| 0 | 21 | 17,500 | >1MM(est.) |
| 1 | 35 | 26,000 | |
| 2 | 35 | 5,000 | 415,000 |
| 4 | 35 | 960 | 225,000 |
| 5 | 35 | <500 | 160,000 |

The molecular weights were determined by gel permeation chromotography. The molecular weights of the homopolymer of acrylic acid and the copolymer which contained 1% sodium methallylsulfonate could not be determined by this method. Their molecular weights were too high for the column. The molecular weight of the homopolymer was estimated to be in excess of one million based on a comparison of its solution viscosity with the solution vicosity of polyacrylic acids of known molecular weight.

No inhibition of polymerization was noted with increasing amounts of sodium metallylsulfonate monomer.

EXAMPLE 2

A series (Table II) of polyacrylamides were prepared via an inverse emulsion polymerization procedure to demonstrate the effect of sodium methallylsulfonate on molecular weight as demonstrated by solution viscosity.

To 85 parts of kerosene and 5 parts of sorbitan monooleate (Span 80, Atlas Chemical Industries) in a suitable reactor was added with stirring a solution containing 320 parts of 50% aqueous acrylamide, 0.07 part of tetrasodium ethylenediamine tetraacetic acid (EDTA), 25 parts of sodium chloride, 11 parts of polyoxyethylene sorbitan monooleate (Tween 81, Atlas Chemical Industries) and the sodium methallylsulfonate. The formed preemulsion was sparged with nitrogen for 20 minutes and was heated to 45° C. A polymerization catalyst, 0.3 part of a 5% solution of 2,2'-azo-bis(2,4-dimethyl valeronitrile) [Vazo 52, DuPont de Nemours] in toluene, was added. The exothermic reaction was controlled by intermittent cooling. Two more 0.3 part portions of the catalyst solution were added at one hour and 2 hours after the first addition. A total of 4 hours heating at 45° C. completed the polymerizations. The product emulsions were inverted in water to give smooth aqueous solutions containing 1% polymer.

TABLE II

| Weight % Sodium Methallylsulfonate In Polymer With Acrylamide | Brookfield Viscosity, CPS RVT, 20 RPM, 1% Solutions |
|---|---|
| 0 | 1500 |
| 0.05 | 600 |
| 0.125 | 100 |
| 0.42 | 30 |
| 1.75 | Nil |

No inhibition of polymerization was noted.

EXAMPLE 3

Two 95/5 wt./wt. Acrylamide/Acrylic Acid copolymers were prepared via an inverse emulsion procedure similar to the one described in Example 2 containing 0 and 0.05 wt. % sodium methallylsulfonate. Smooth 1% polymer solutions were prepared by inverting the emulsions into water.

TABLE III

| Weight % Sodium Methallylsulfonate In Copolymer | Brookfield Viscosity, CPS RVT, 20 RPM, 1% Solutions |
|---|---|
| 0 | 2000 |
| 0.05 | 980 |

EXAMPLE 4

Two 90/10 wt./wt. acrylamide/methacrylamido propyl trimethyl ammonium chloride copolymers were prepared via an inverse emulsion procedure similar to the one described in Example 2 containing 0 and 0.1 wt. % sodium methallysulfonate. Smooth 1% polymer solutions were prepared by inverting the emulsions into water.

TABLE IV

| Weight % Sodium Methallylsulfonate In Copolymer | Brookfield Viscosity, CPS RVT, 20 RPM, 1% Solutions |
|---|---|
| 0 | 2400 |
| 0.1 | 50 |

EXAMPLE 5

Two ammonium polyacrylate polymers were prepared via an inverse emulsion technique similar to the one described in Example 2 containing 0 and 0.1 wt. % sodium methallylsulfonate. Smooth 0.5% polymer solutions were prepared by inverting the emulsions into water.

TABLE V

| Weight % Sodium Methallylsulfonate In Copolymer | Brookfield Viscosity, CPS RVT, 20 RPM, 1% Solutions |
|---|---|
| 0 | 3000 |
| 0.1 | 1400 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for preparing a water-soluble polymer of controlled low molecular weight which comprises copolymerizing a mixture comprising water-soluble monomers, which includes between about 0.01–5 weight percent alkali metal methallylsulfonate or methallylsulfonic acid based on the weight of monomers, in an aqueous medium under free radical polymerization conditions wherein the molecular weight of the resulting water-soluble polymer is inversely proportional to the amount of alkali metal methallylsulfonate or methallylsulfonic acid.

2. A process in accordance with claim 1 wherein the alkali metal methallylsulfonate is sodium methallylsulfonate.

3. A process in accordance with claim 1 wherein the mixture of water-soluble monomers contains acrylamide.

4. A process in accordance with claim 1 wherein the mixture of water-soluble monomers contains acrylic acid.

5. A process in accordance with claim 1 wherein the mixture of water-soluble monomers contains an acrylic acid or its salts.

6. A process in accordance with claim 1 wherein the mixture of water-soluble monomers contains a minor quantity of water-insoluble monomer.

7. A process in accordance with claim 1 wherein the polymerization is conducted as an aqueous solution system at a temperature between about 20°–100° C.

8. A process in accordance with claim 1 wherein the polymerization is conducted as a water-in-oil emulsion system at a temperature between about 20°–80° C.

9. A process in accordance with claim 1 wherein the water-soluble polymer is polyacrylic acid and has a molecular weight in the range between about 10,000–500,000.

10. A process in accordance with claim 1 wherein the water-soluble polymer is polyacrylamide and has a molecular weight in the range between about 100,000–2,000,000.

11. A process in accordance with claim 1 wherein the water-soluble polymer is poly(acrylamide-acrylic acid) and has a molecular weight in the range between about 100,000–2,000,000.

* * * * *